(12) United States Patent
Dassouli et al.

(10) Patent No.: US 10,024,709 B2
(45) Date of Patent: Jul. 17, 2018

(54) METHOD AND SYSTEM TO QUICKLY DETERMINE A WEIGHT

(71) Applicant: WITHINGS, Issy les Moulineaux (FR)

(72) Inventors: Houcine Dassouli, Paris (FR); Nicolas Genain, Paris (FR); Joffrey Villard, Lyons (FR); Xavier Debreuil, Meudon (FR); Cédric Hutchings, Brookline, MA (US); Brice Brac de la Perriere, Asnieres sur Seine (FR)

(73) Assignee: WITHINGS, Issy les Moulineaux (FR)

( * ) Notice: Subject to any disclaimer, the term of this patent is extended or adjusted under 35 U.S.C. 154(b) by 196 days.

(21) Appl. No.: 15/202,261

(22) Filed: Jul. 5, 2016

(65) Prior Publication Data

US 2018/0010956 A1    Jan. 11, 2018

(51) Int. Cl.
*G01G 19/44* (2006.01)
*G01G 3/142* (2006.01)
*G01G 3/14* (2006.01)

(52) U.S. Cl.
CPC ............. *G01G 19/44* (2013.01); *G01G 3/142* (2013.01); *G01G 3/1414* (2013.01)

(58) Field of Classification Search
CPC ....... G01G 3/1414; G01G 3/142; G01G 19/44
See application file for complete search history.

(56) References Cited

U.S. PATENT DOCUMENTS

| | | | | |
|---|---|---|---|---|
| 4,008,405 A * | 2/1977 | Neumann | ............... | G01G 23/37 177/25.14 |
| 4,817,026 A * | 3/1989 | Inoue | ................... | G01G 3/1414 177/185 |
| 5,062,492 A | 11/1991 | Inoue | | |
| 5,178,228 A * | 1/1993 | Feinland | ................ | G01G 23/10 177/185 |
| 5,635,679 A * | 6/1997 | Kohashi | ............... | G01G 19/035 177/1 |
| 7,872,201 B1 * | 1/2011 | Whitney | ................ | G01G 23/01 177/25.13 |
| 9,526,451 B1 * | 12/2016 | Berme | ................... | A61B 5/486 |

(Continued)

*Primary Examiner* — Natalie Huls
(74) *Attorney, Agent, or Firm* — Miller, Matthias & Hull LLP

(57) ABSTRACT

A method for determining the weight of an entity/item to be weighed on a weighing device (1), the weighing device comprising at least a weight sensor and a control unit (4), the method comprising the following steps:

/a/ collecting weight raw samples (WSi) of the total weight sensed at the weight sensor(s), at a sampling frequency (F0), and converting each of the weight raw samples (WSi) into digitalized weight raw samples (DSi), /b/ entering sequentially each of the digitalized weight raw samples (DSi) into a Butterworth filter, the latter issuing filtered weight samples (FSi), /c/ defining a rolling window (RW) containing a parametrized number NS of latest filtered weight samples (FSi), /d1/ determining, in the rolling window, the minimum (MIN) and maximum (MAX) values of filtered weight samples, /d2/ comparing the value of MAX−MIN with regard to a parametrized Threshold (T), /e/ if MAX−MIN is greater than Threshold (T), repeat steps /a/ to /d2/, and as soon as MAX−MIN is less than Threshold (T), output a final weight value (DV), obtained from one or more of the most recent filtered weight samples.

13 Claims, 4 Drawing Sheets

(56) References Cited

U.S. PATENT DOCUMENTS

| | | | | |
|---|---|---|---|---|
| 2003/0121748 A1* | 7/2003 | Harvey | ............... | F16D 25/12 |
| | | | | 192/85.01 |
| 2008/0019122 A1* | 1/2008 | Kramer | ............ | A47G 19/025 |
| | | | | 362/154 |
| 2012/0299731 A1* | 11/2012 | Triener | ............ | G01G 17/08 |
| | | | | 340/573.1 |
| 2013/0124142 A1* | 5/2013 | Zeck | ............... | G01G 19/387 |
| | | | | 702/173 |
| 2015/0338265 A1 | 11/2015 | Carreel et al. | | |

* cited by examiner

METHOD AND SYSTEM TO QUICKLY DETERMINE A WEIGHT

FIELD OF THE INVENTION

The present invention relates to methods and systems for determining the weight of an entity to be weighed on a weighing device, notably for determining the weight of a human individual (adult or baby) standing or lying on an electronic scale.

BACKGROUND OF THE DISCLOSURE

There is a need to quickly determine the weight of an object or a human individual set on a weighing device or scale.

However, in weighing scales, there are many unwanted transients and frequency components, like vibrations which occur when an object/person comes to be placed on the platform, or like transients coming from small movements made by the person standing on the scale. For example, a baby or young child is prone to wriggling when set on a baby/child scale and this generates noisy additions to the weight.

Another type of disturbance exist, sometimes at home, but more often in the manufacturing factory where the weighing device is tested and calibrated, like for instance vibrations coming from nearby machinery (e.g. in buildings: lift, air-conditioning unit, vibratory environment in workshops: stamping press, forklift, machining units, etc. . . . ), It is thus not easy to recover the actual weight from such a noisy signal.

Low pass filtering gives good results to eliminate such transients and frequency components. However, it requires more time to converge toward the actual weight of the object/person present on the scale. Examples of low pass methods include multiple average method as taught for instance in document U.S. Pat. No. 5,062,492. The response time is increased by the various averaging processes.

Therefore, there remains a need to propose a weighing method and device which can provide a reliable result faster than known devices in such noisy conditions. But decrease of response time must not be detrimental to accuracy.

Besides it is another constraint to run the weight measurement process with a low electrical consumption and low computing resources.

Although the present invention is particularly directed to an electronic scale ('bathroom scale' or 'baby scale'), the invention is applicable to any weight measuring device which indicate a calculated value from a rather noisy signal.

SUMMARY OF THE DISCLOSURE

According to one aspect of the present invention, it is disclosed a method for determining the weight of an entity/item to be weighed on a weighing device, the weighing device comprising at least a weight sensor and a control unit, the method comprising the following steps:

/a/ collecting weight raw samples (WSi) of the total weight sensed at the weight sensor(s), at a sampling frequency (F0), and converting each of the weight raw samples (WSi) into digitalized weight raw samples (DSi), /b/ entering sequentially each of the digitalized weight raw samples (DSi) into a Butterworth filter, the latter issuing filtered weight samples (FSi), /c/ defining a rolling window (RW) containing a parametrized number NS of latest filtered weight samples (FSi), /d1/ determining, in the rolling window, the minimum (MIN) and maximum (MAX) values of filtered weight samples, /d2/ comparing the value of MAX−MIN with regard to a parametrized Threshold (T), /e/ if MAX−MIN is greater than Threshold (T), repeat steps /a/ to /d2/, and as soon as MAX−MIN is less than Threshold (T), output a final weight value (DV), obtained from one or more of the most recent filtered weight samples.

Thanks to these dispositions, the method gives a quick and reliable response to possibly noisy weight signals. Further, advantageously the response time is adaptive to the power of noisy components that can be found in the weight signals.

In various embodiments of the invention, one may possibly have recourse in addition to one and/or other of the following arrangements.

The entity/item to be weighed is a human individual standing or lying on the weighing device, and at step /e/ the final weight value (DV) is displayed on a display. It turns out that the disclosed method is particularly well-suited for a personal electronic scale. It gives quick and reliable results to weigh a person, adult, young child or baby.

According to one option, the outputted final weight value (DV) is equal to the average of the NS most recent filtered weight sample.

Benefit: the average thus already computed is readily available for provisional display.

However, in alternative embodiments, the outputted final weight value (DV) can be equal to the most recent filtered weight sample or sample(s).

Preferably, all the steps are performed subsequently at the sampling frequency (F0). Thereby, the computation is done substantially in real time, with a calculation loop requiring less than T0 (=1/F0).

The Butterworth filter is preferably a second order Butterworth filter. It turns out to be a particularly relevant solution to filter the digitalized weight samples.

According to one option, the sampling frequency (F0) may preferably be comprised between 20 Hz and 500 Hz. It is a good compromise between computing resources requirement and response time optimization.

The number NS may be preferably less than 100. It requires few memory resources.

According to one option, the parametrized Threshold (T) is predefined and comprised between 100 g and 200 g. Whereby a very good compromise is achieved regarding accuracy versus time to converge.

Alternatively, the parametrized Threshold (T) can be set according to the weight range, preferably partly in proportional relationship. Whereby the compromise regarding accuracy versus time-to-converge is adapted to the weight range.

The present invention also targets a device, continue to carry out the method set out above.

The present invention also targets a system, including the device as defined above and optionally a smartphone (9) configured to display data and weight histograms.

BRIEF DESCRIPTION OF THE DRAWINGS

Other features and advantages of the invention appear from the following detailed description of one of its embodiments, given by way of non-limiting example, and with reference to the accompanying drawings, in which.

DETAILED DESCRIPTION OF THE DISCLOSURE

In the figures, the same references denote identical or similar elements.

Figure 1:
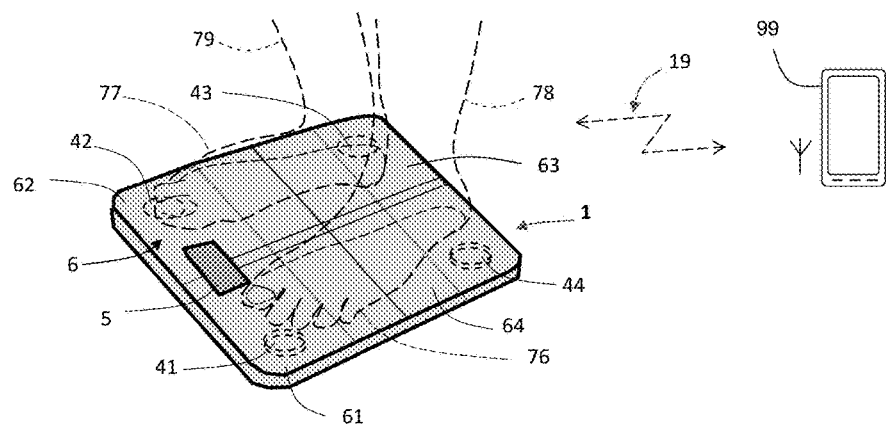
FIG. 1 illustrates a bathroom scale, such type of weighing device being suitable to carry out the method according to the present invention.

FIG. 1 shows an example of a digital scale 1 (also known as 'bathroom scale') on which a user can stand in order to measure his or her weight. In the example shown, the legs 78, 79 of the user are partially visible, as are the feet 76, 77 which are illustrated as bare. However, the user can bear socks and shoes in the context of the present invention.

The digital scale 1 comprises a main body that is generally rectangular or square in shape, and four feet 41-44 respectively arranged near the four corners of the body, each foot associated with measurement means.

More specifically, in the example shown here, the left front foot 41 comprises a strain gauge, the right front foot 42 comprises a strain gauge, the right rear foot 43 comprises a strain gauge, and the left rear foot 44 comprises a strain gauge. Each strain gauge is also known as 'load cell' or more generally 'weight sensor'.

It is understood that the digital scale could also have a different number of strain gauges, without a direct relation to the number of feet. In particular, there could be only one central strain gauge, or two strain gauges, or even three strain gauges. It is also not excluded to have more than four strain gauges.

The digital scale 1 further comprises an electronic control unit 4 (also referred to herein as an 'electronic unit') and a display 5 which will be discussed in more detail below.

In addition, the digital scale 1 may have a top surface 6 comprising four, six or eight conducting portions 61-64 arranged on said top surface which are electrically insulated from each other, for the purpose of measuring impedance across one foot or from one foot to the other.

These conducting portions 61-64 serve as electrodes in contact with the user's feet. A current is injected between two portions and an electric potential difference is measured between these same two portions, more details can be found in US2015338265 [to Withings].

Various data can be obtained in case of using eight conducting portions, such as heart rate, heart pulse wave velocity, an image of arterial rigidity, an image of blood pressure.

The digital scale 1 may further comprise a wireless interface 19 (Bluetooth™ or the like) to send and/or receive data to/from a smartphone 99. The smartphone 99 is configured to display data and weight histograms relating to the user. The smartphone 99 also allows to input the user's profile, namely, age, gender, height and so on.

Figure 2:
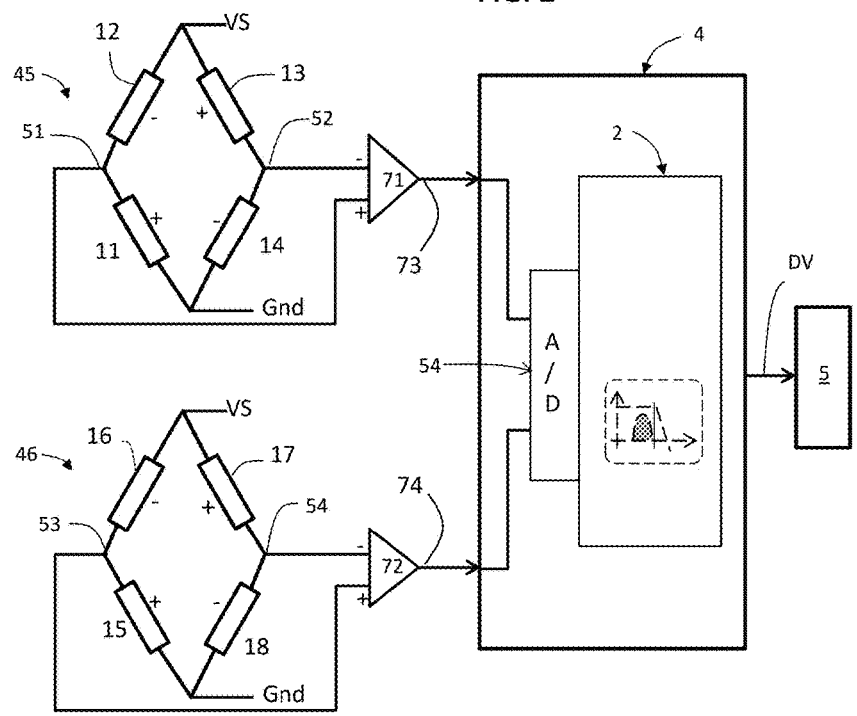
FIG. 2 shows a block diagram of the weighing device.

As illustrated on FIGS. 1 and 2, in one exemplary embodiment of the present disclosure, each strain gauge comprises two sensing elements namely a first element whose resistance increases under a vertical compression applied to the feet concerned and a second element whose resistance decreases under said vertical compression. First elements are denoted 11, 13, 15, 17. Second elements are denoted 12, 14, 16, 18.

First and second elements are connected to the electronic control unit 4 by means of first and second Wheatstone bridges 45, 46 which are shown in FIG. 2. Each of first and second Wheatstone bridges 45, 46 are supplied between a voltage source VS and a reference voltage Gnd. A first comparator 71 formats the electric potential difference between the intermediate points 51 and 52 of the first Wheatstone bridge 45 and provides an output 73 indicative of the weight present on one half of the scale. A second comparator 72 formats the electric potential difference between the intermediate points 53 and 54 of the second Wheatstone bridge 46 and provides an output 74 indicative of the weight present on the one other half of the scale.

Each of the outputs 73, 74 from the Wheatstone bridges is then sent to the electronic control unit 4 comprising a microcontroller 2, where they are converted into digital values by an analog-to-digital converter 54. The two digital values are summed by an adder function in the microcontroller 2.

Note: addition can also be performed in analog domain before digital conversion.

Generally speaking, the resulting total weight DV is displayed on the display 5.

More details about Wheatstone bridges, analog-to-digital conversion and additive functions can be found in US2015338265 [to Withings].

It should be noted that besides the above mentioned electronic scale, the present invention can be applied to different type of weighing devices, among which baby scales, weighing machines for sorting process, with one or more weight sensor. Therefore, we consider in the present invention a generically-defined weighing device comprising at least a weight sensor, the weighing device being configured to determine the weight of an entity (person or object or item) to be weighed.

Focusing again on personal type scale for adult, child or baby, this kind of weighing device is electrically supplied by a rather small battery, and furthermore the cost of this kind of device must be low. Therefore it is a target to use a microcontroller with a very low electrical consumption in order to obtain a long lifetime autonomy for the battery.

Furthermore, to achieve a low-cost bill of material, one must select a microcontroller with low resources in term of memory space and admissible clock frequency.

As will be explained in details further, the microcontroller 2 performs a filtering process and a decision making process to output a filtered stabilized weight value.

More precisely, the microcontroller 2 performs the following operations from the total weight sensed at the weight sensor(s).

Step a/

Weight raw samples (WSi) of the total sensed weight, are collected, at a sampling frequency F0, and each of the weight raw samples WSi are converted into digitalized weight raw samples DSi. Weight raw samples WSi are shown by curve 81 at FIG. 3. The sampling frequency F0 is chosen in a range [20 Hz-500 Hz]; preferably, one can choose a sampling frequency comprised between 50 Hz and 100 Hz.

Each digitalized weight raw sample is typically encoded in a 2 bytes word. Quantization error is therefore very small. However it is also possible to encode each digitalized weight raw sample on 12 bits, or on more than 2 bytes, namely 4 bytes ("float" type). The used word length is denoted WL (in bytes).

After each clock tick, a new weight raw sample WSi+1 is digitalized into DSi+1.

Step b/

Each of the weight raw samples DSi are entered sequentially into a Butterworth filter, the latter issuing filtered weight samples FSi.

This is preferably done with a clock corresponding to the sampling frequency F0.

The Butterworth cutting frequency is chosen between 1.5 Hz and 3 Hz.

Figure 5:
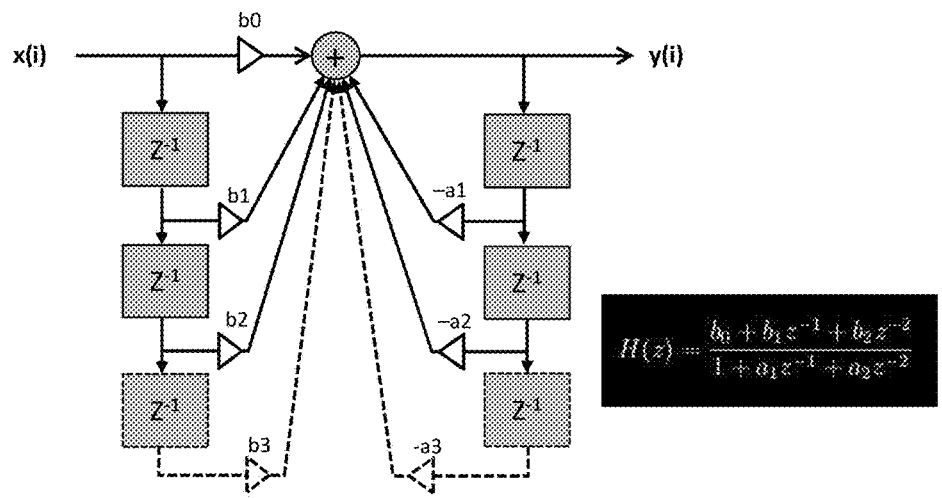
FIG. 5 shows an example of a Butterworth filter schematics.

The Butterworth filter can be implemented as shown at FIG. 5.

The inventors have found that a second order Butterworth filter gives amazingly unexpected good results.

As illustrated at FIG. 5, x(i) are the discrete inputs of the Butterworth filter, and y(i) are the discrete outputs of the Butterworth filter.

In the context of the present invention, x(i)=DSi and FSi=y(i).

Each filtered weight sample FSi is typically encoded in a 2 bytes word.

Coefficients b0, b1, b2, a1, a2 are parameters that are determined according to the type of weighing device.

It is not excluded to use a third order Butterworth filter, additional branches shown in dotted lines with coefficients a3, b3.

These parameters can be tuned after a test campaign on several persons for a personal scale. After each clock tick, a new recurrence of the Butterworth filter is computed; in other words, FSi+1 is computed from DSi+1, DSi, DSi−1, and also FSi and FSi−1.

Generally, with reference to FIG. 5, a second order Butterworth filter follows the recurrence equation:

$$y(i) = \sum_{k=1}^{k=2} a_i y(i-k) + \sum_{k=0}^{k=2} b_i x(i-k)$$

According to one example among many, b0=1; b1=0; b2=0; a1=0, 7; a2=1.

Step c/

A rolling window RW is defined, this rolling window RW contains a parametrized number NS of latest filtered weight samples FSi. NS is likewise called the "depth" of the window.

Figure 6:
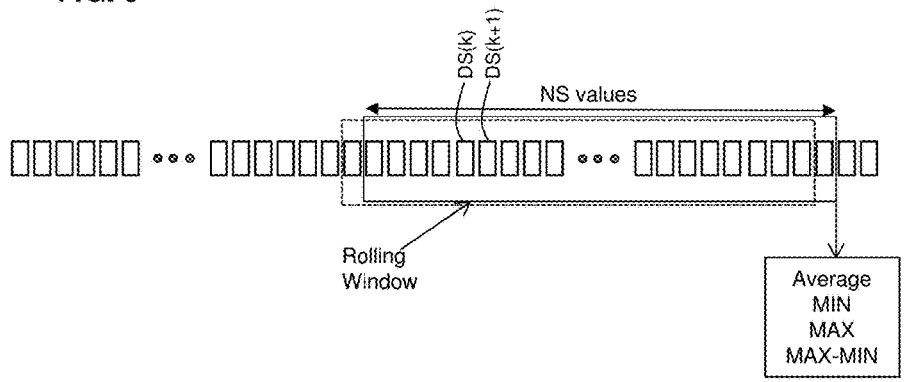
FIG. 6 illustrates the rolling window.

This rolling window RW is illustrated at FIG. 6.

NS is an integer chosen between 50 and 150, preferably between 80 and 100.

The memory of the microcontroller keeps the NS filtered weight values, therefore the rolling window requires NS×WL bytes.

For NS=80 and WL=2, the required memory space is 160 bytes

For NS=100 and WL=4, the required memory space is 400 bytes

To give an idea of the time length of the rolling window:

At F0=100 Hz and NS=80, the time length of the rolling window is 0.8 s.

At F0=80 Hz and NS=100, the time length of the rolling window is 1.25 s.

After each clock tick, the rolling window is shifted (therefore the most ancient value is discarded), and the new filtered weight value FSi+1 is added to the void position.

The rolling window RW is initialized with default values, for example 0, in NS available positions. As soon as new FSi values are computed from step b/, default values are replaced by FSi values, from position 1 to position NS. As soon as the position NS is reached, the rolling process is carried out, namely discarding the oldest value, shifting the content of all positions and loading the most recent value in the void position.

Note: Following steps d1/, d2/ and e/ are not performed until the rolling window RW is initialized with NS values different from default value.

Step d1/

Within the rolling window, the minimum MIN and maximum MAX values of filtered weight samples are determined. MIN is the minimum value contained in rolling window. MAX is the maximum value contained in rolling window.

After each clock tick, the minimum MIN and maximum MAX values are computed with the updated content of the rolling window.

Step d2/

Then, the value of MAX−MIN is compared with regard to a parametrized Threshold T.

"MAX−MIN" refers to the difference namely MIN subtracted from MAX

After each clock tick, a new comparison is performed.

Whenever MAX−MIN is greater than (or equal to) Threshold T, steps a/ to d2/ are repeated at the next period T0 (=1/F0), namely at the next clock tick. This condition means that the convergence of weight determination is not achieved yet.

Preferably, the parametrized Threshold T can be predefined and comprised between 100 g and 200 g. This represents a good accuracy target for an adult weight.

According to one particular aspect, the parametrized Threshold T is made dependent on the weight range of the person to be weighed; the parametrized Threshold T can preferably be calculated partly in proportional relationship with regard to the first samples DSi of the measurement. For example T is chosen closer to 200 g for a person weighing 100 kg or more, T is chosen closer to 100 g for a person weighing between 50 kg and 100 kg. T can be chosen smaller than 100 g for babies.

Step e/

As soon as MAX−MIN<Threshold T, the microcontroller outputs a final weight value denoted DV, obtained from one or more of the most recent filtered weight samples. This condition means that the convergence of weight determination is believed to be achieved.

According to one possible implementation, the outputted final weight value (DV) is equal to the average of the NS most recent filtered weight sample.

$$DV = \sum_{k=i-NS+1}^{k=i} \frac{FS(k)}{NS}$$

According to another possible implementation, the outputted final weight value (DV) is equal to the NH most recent filtered weight sample, NH being comprised between 1 and 10.

$$DV = \sum_{k=i-NH+1}^{k=i} \frac{FS(k)}{NH}$$

The final weight value DV may be used for other purpose than direct display, like calculation of BMI (Body Mass Index), display of consistent histograms on the smartphone.

Figure 3:
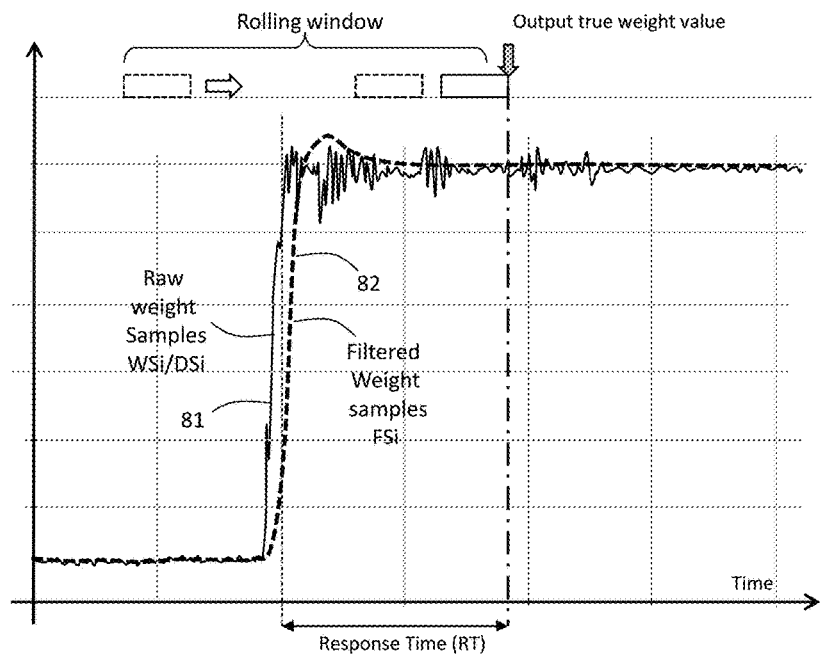
FIG. 3 is an example time chart showing an example of raw weight samples and filtered weight samples, together with a rolling window.
Figure 4:
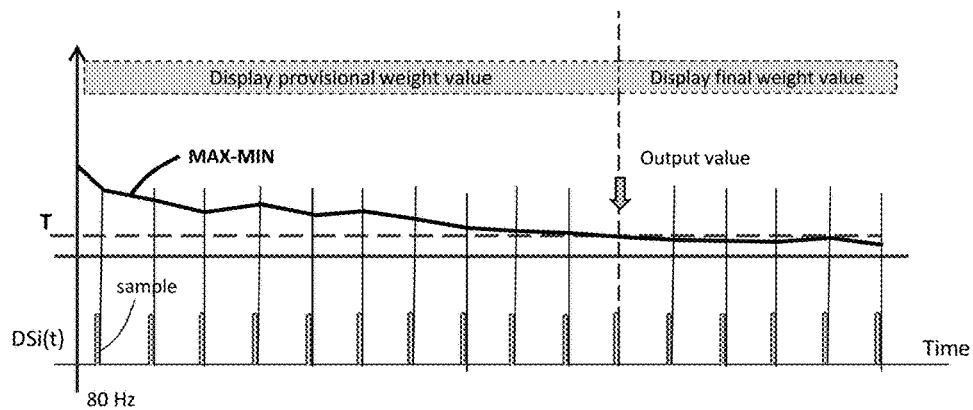
FIG. 4 is more detained time chart exhibiting the rolling window output.

"Response time" RT is defined as the delay between a sharp increase in the sensed weight and output of value DV (see FIG. 3).

Surprisingly, the inventors have found that Response Time is at least 50% below known averaging methods.

Advantageously, decreased Response Time is achieved without affecting negatively other constraint ratings like low electrical consumption and low amount of required computing resources Efficiency index EFI=accuracy/Response Time/Computing resources Surprisingly, the inventors have found that Efficiency index EFI is twice better than same index in known averaging methods.

The microcontroller 2 can advantageously be chosen as a low-spec low-cost microcontroller.

Figure 7:
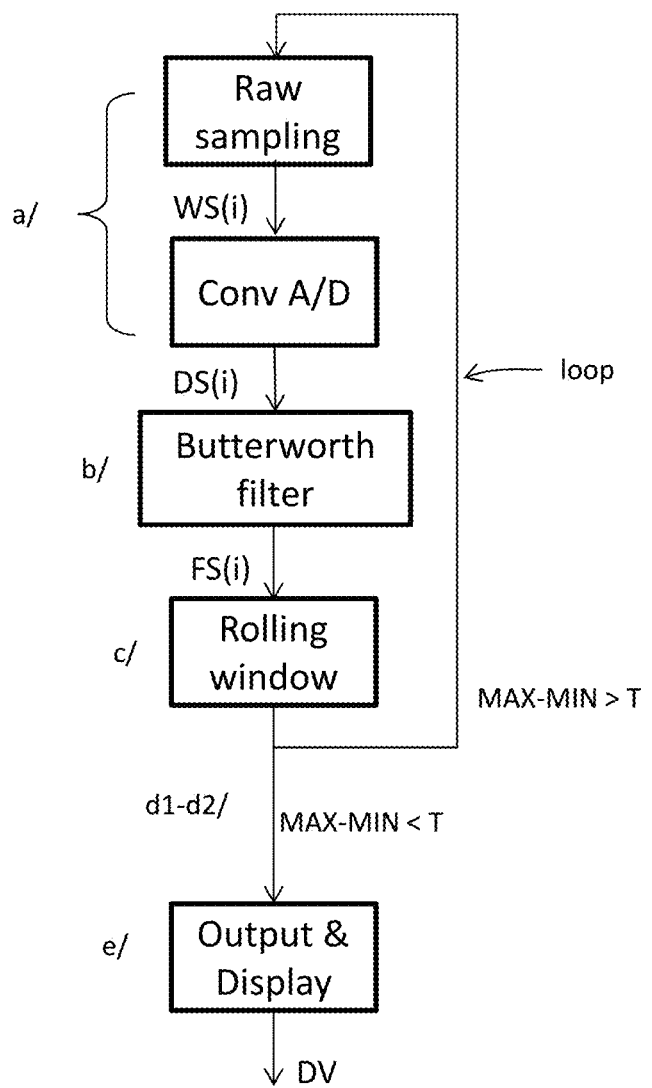
FIG. 7 illustrates the steps of the method.

FIG. 7 illustrates a summary of the steps involved in the method, exhibiting steps a/ b/ c/ d1/ d2/ and e/.

The invention claimed is:

1. A weighing device, formed as a bathroom scale or a baby scale, comprising at least a weight sensor and a control unit, the control unit being configured to:
   /a/ collect weight raw samples (WSi) of the total weight sensed at the load cells, at a sampling frequency (F0), and converting each of the weight raw samples (WSi) into digitalized weight raw samples (DSi),
   /b/ enter sequentially each of the digitalized weight raw samples (DSi) into a Butterworth filter, the latter issuing filtered weight samples (FSi),
   /c/ define a rolling window (RW) containing the last NS filtered weight samples (FSi), NS being a parametrized number,
   /d1/ determine, in the rolling window, the minimum (MIN) and maximum (MAX) values of filtered weight samples,
   /d2/ compare the value of MAX-MIN with regard to a parametrized Threshold (T),
   /e/ and as soon as MAX-MIN is less than Threshold (T), output a final weight value (DV), obtained from one or more of the most recent filtered weight samples.

2. The device of claim 1, further comprising the at least weight sensor is formed as a plurality of load cells and further comprising a display.

3. The device of claim 1, further comprising an impedance sensor.

4. A system comprising a device as defined in claim 1, and further comprising a smartphone (9) configured to display data and weight histograms.

5. A method for determining the weight of an entity/item to be weighed on a weighing device (1), the weighing device comprising at least a weight sensor and a control unit (4), the method comprising the following steps:
   /a/ collecting weight raw samples (WSi) of the total weight sensed at the weight sensor(s), at a sampling frequency (F0), and converting each of the weight raw samples (WSi) into digitalized weight raw samples (DSi),
   /b/ entering sequentially each of the digitalized weight raw samples (DSi) into a Butterworth filter, the latter issuing filtered weight samples (FSi),
   /c/ defining a rolling window (RW) containing a parametrized number NS of latest filtered weight samples (FSi),
   /d1/ determining, in the rolling window, the minimum (MIN) and maximum (MAX) values of filtered weight samples,
   /d2/ comparing the value of MAX−MIN with regard to a parametrized Threshold (T),
   /e/ if MAX−MIN is greater than Threshold (T), repeat steps /a/ to /d2/, and as soon as MAX−MIN is less than Threshold (T), output a final weight value (DV), obtained from one or more of the most recent filtered weight samples.

6. The method of claim 5, wherein the entity/item is a human individual standing or lying on the weighing device, and wherein at step /e/ the final weight value (DV) is displayed on a display.

7. The method of claim 6, wherein the Butterworth filter is a second order Butterworth filter.

8. The method of claim 6, wherein the sampling frequency (F0) is comprised between 20 Hz and 500 Hz.

9. The method of claim 6, wherein the number NS is less than 100.

10. The method of claim 6, wherein the parametrized Threshold (T) is predefined and comprised between 100 g and 200 g.

11. The method of claim 6, wherein the parametrized Threshold (T) is set according to the weight range.

12. The method of claim 5, wherein the outputted final weight value (DV) is equal to the average of the NS most recent filtered weight sample.

13. The method of claim 5, wherein all the steps are performed subsequently at the sampling frequency (F0).

* * * * *